United States Patent [19]

Faust

[11] 3,953,354

[45] Apr. 27, 1976

[54] ENCAPSULATED CALCIUM HYPOCHLORITE GRANULES

[75] Inventor: John P. Faust, Hamden, Conn.

[73] Assignee: Olin Corporation, New Haven, Conn.

[22] Filed: June 27, 1973

[21] Appl. No.: 374,153

Related U.S. Application Data

[63] Continuation-in-part of Ser. No. 150,782, June 7, 1971, abandoned.

[52] U.S. Cl. ............................ 252/187 H; 252/95; 252/385; 423/474; 427/215
[51] Int. Cl.² C01B 11/06; C11D 3/395; D06L/3/08
[58] Field of Search ................ 252/187 H, 385, 95; 117/100 B; 423/474; 427/215

[56] References Cited

UNITED STATES PATENTS

| | | | |
|---|---|---|---|
| 2,901,435 | 8/1959 | Robson | 252/187 H |
| 2,963,440 | 12/1960 | Robson | 252/187 H |
| 3,036,013 | 5/1962 | Jaszka | 252/187 H |
| 3,234,141 | 2/1960 | Robson | 252/187 H |
| 3,560,396 | 2/1971 | Robson | 252/187 H |

Primary Examiner—Benjamin R. Padgett
Assistant Examiner—Irwin Gluck
Attorney, Agent, or Firm—Donald F. Clements; T. P. O'Day; James B. Haglind

[57] ABSTRACT

Calcium hypochlorite compositions, suitable for bleaching and sanitation uses, are provided which have improved resistance to exothermic decomposition. These novel compositions are granules comprised of a core of calcium hypochlorite encapsulated with a coating comprised of a mixture of calcium hypochlorite dihydrate and a water soluble inorganic salt which is non-reactive with and stable in contact with calcium hypochlorite. Generally the coating comprises from about 5 to about 60 percent by weight of each granule and the proportion of water soluble salt ranges from about 0.1 to about 15 percent by weight of each granule. The granular product also resists dusting and caking and has improved retention of its available chlorine on storage.

17 Claims, No Drawings

ENCAPSULATED CALCIUM HYPOCHLORITE GRANULES

This patent application is a continuation-in-part of an earlier filed U.S. application Ser. No. 150,782, filed June 7, 1971, now abandoned.

This invention relates to novel calcium hypochlorite compositions and the method of making them. In one aspect, the invention relates to solid, granular compositions containing diluents normally present in solid calcium hypochlorite and having a coating of a mixture of calcium hypochlorite dihydrate and further amounts of inorganic diluent salt stable to contact with calcium hypochlorite. These novel compositions are designed and have the advantage, over calcium hypochlorite compositions previously known to the art, of having a substantially slower rate of decomposition when contacted with certain organic compounds or other readily oxidizable materials or by heat or fire.

Calcium hypochlorite is a well known source of "dry chlorine" for sanitation purposes, for example, in disinfecting the water of swimming pools. Calcium hypochlorite is added to the water to maintain a small residual of "available chlorine," suitably from about 0.5 to about 1.5 parts per million parts of water, which is generally sufficient to insure prompt destruction of bacterial contamination, so that the water is safe to swim in.

Because of the highly reactive nature of calcium hypochlorite numerous attempts have been made to diminish the rate of reaction without adversely affecting the available chlorine content of the final product. For example, calcium hypochlorite has been admixed wih other dry solids, including a variety of diluents and especially detergents in order to utilize the bleaching effect of calcium hypochlorite without excess deterioration of laundry. See U.S. Pat. Nos. 1,961,576, 2,320,279, 2,320,280, 2,166,362, 2,166,363 and 2,959,554 in this regard.

In U.S. Pat. No. 2,963,440, which issued Dec. 6, 1970 to Homer L. Robson, there is disclosed a dry mixture of calcium hypochlorite and a large percentage (57-86 percent) of a diluent salt. U.S. Pat. No. 3,560,396, issued Feb. 2, 1971 to Homer L. Robson, describes another dry mixture of calcium hypochlorite and from 10 to 15 percent by weight of spray-dried sodium nitrate of specific particle size. U.S. Pat. No. 3,234,141, issued Feb. 8, 1966 to Homer L. Robson, discloses a process in which calcium hypochlorite is admixed with sodium sulfate and an inert alkali metal salt such as sodium chloride, and the resulting mixture is compressed and extruded in the form of modified triangular prisms with one rounded edge. U.S. Pat. No. 2,901,435, issued Apr. 25, 1959 to Homer L. Robson discloses a process for coating calcium hypochlorite with sodium chloride in which spray dried calcium hypochlorite particles having a hollow center are admixed with an aqueous slurry containing sodium chloride grains having a maximum size of 30 microns, and spray drying the slurry to form hollow coated calcium hypochlorite particles which are less than about 1000 microns in diameter. The product of this process contains at least about 50 percent by weight of sodium chloride and the available chlorine content ranges from about 10 to 35 percent.

U.S. Pat. No. 3,036,013 issued May 22, 1962 to Daniel J. Jaszka et al., discloses a process for coating calcium hypochlorite by reacting the outer surface of calcium hypochlorite particles with an aqueous solution of a reactive alkali metal salt such as a borate or carbonate, and drying the treated calcium hypochlorite particles to form calcium hypochlorite granules coated with the corresponding calcium salt of the alkali metal salt. None of these techniques have been completely satisfactory because the available chlorine content of the calcium hypochlorite product is markedly reduced by reaction with the diluent or by dilution with excessive quantities of diluents.

In another recent development, described in U.S. Pat. No. 3,544,267, issued on Dec. 1, 1970 to George Roman Dychdala a measured amount of water is uniformly added to an essentially dry calcium hypochlorite product, until the water content reaches about 4 to 15 percent. The calcium hypochlorite preparation thus produced is stated to be a free-flowing particulate composition which is less susceptible to decomposition, free from dust and has a particle size having a diameter in the range of about 0.075 to 2mm.

One object of this invention is to provide high test calcium hypochlorite compositions which have improved resistence to decomposition but with the addition of an inorganic salt diluent to render the granules non-caking and more stable with respect to loss of available chlorine on storage.

Another object of the present invention is to provide novel granular calcium hypochlorite compositions having materially lowered rates of propagation of decomposition and improved resistance to caking and loss of available chlorine compared with previously available compositions.

Another object of the present invention is to provide an improved method of preparing the novel calcium hypochlorite compositions of this invention.

These and other objects of this invention will be apparent from the following detailed description of the invention.

It has now been discovered that these and other objects of the invention are accomplished when particles of calcium hypochlorite containing less than about 5 percent by weight of water and at least about 65 percent by weight of calcium hypochlorite are admixed with an aqueous solution of a water soluble salt which is non-reactive with and stable to calcium hypochlorite. The water soluble salt is selected from the group consisting of alkali metal salts, alkaline earth metal salts and mixtures thereof. When calcium hypochlorite particles of this type are contacted with the aqueous solution, a coating forms on the surface of the calcium hypochlorite particles which is comprised of a mixture of calcium hypochlorite dihydrate and the water soluble salt. This coating which encapsulates the calcium hypochlorite particles generally ranges from about 5 to about 60 percent by weight of each granule. The proportion of water soluble salt in the coating generally ranges from about 0.1 to about 15 percent by weight of each granule. The resulting encapsulated calcium hypochlorite granules resist dusting, caking and decomposition of an exothermic nature. In addition, the novel calcium hypochlorite composition has improved retention of available chlorine on storage.

The starting material for the purposes of the present invention is a solid, dry calcium hypochlorite composition containing at least about 65 percent by weight of calcium hypochlorite and less than about 5 percent of water, the balance being inert materials usually resulting from the process of manufacture, e.g., sodium chloride, calcium hydroxide, chloride and carbonate. In a heretofore customary practice of calcium hypochlorite manufacture, the calcium hypochlorite is obtained as a slurry containng crystals of calcium hypochlorite dihydrate [$Ca(OCl)_2 \cdot 2H_2O$] in a mother liquor consisting essentially of an aqueous solution of calcium hypochlorite and sodium chloride. The slurry is filtered on a rotary vacuum filter to produce a cake that retains sufficient mother liquor to have a moisture content of 45 percent to 50 percent by weight. The wet cake, e.g., from an Eimco Filter, when dried directly yields the 70 percent calcium hypochlorite of commerce. However, if a higher concentration of calcium hypochlorite is desired, the wet cake may be washed with water to remove some of the mother liquor and then filtered or centrifuged or otherwise processed to separate further quantities of liquor and to form a wet solid which on drying produces granules which contain from about 85 to 90 percent by weight of calcium hypochlorite. The latter granules are also suitably used as a starting material according to this invention.

The calcium hypochlorite content of the granules used as a starting material is generally at least about 65 percent and preferably ranges from about 70 to about 90 percent by weight.

For purposes of the present invention, commercial calcium hypochlorite preparations are generally suitable but specially high test compositions are sometimes desirably used. Commercial calcium hypochlorite as sold usually contains at least 70 percent available chlorine and as manufactured contains 71 to 73 percent of calcium hypochlorite and less than 5 percent water, preferably less than 1 percent water. Concentration ranges of usual impurites associateed with commercial calcium hypochlorite are given in Table I, Column I, below. A typical analysis of a specific commercial calcium hypochlorite product, is given in Column 2. However, it is possible to prepare calcium hypochlorite preparations of greater purity, and if the product is to be blended with a specific diluent, such as sodium nitrate, in large proportions to improve resistance to exothermic decomposition, the higher test product, such as given in Column 3, is advantageously used as a starting material.

TABLE I

| Component | Column 1 Commercial Range | Column 2 Commercial Product | Column 3 Special High Test Product |
|---|---|---|---|
| Calcium hypochlorite | 70.0–74.5 | 71.7 | 86.0 |
| Calcium chloride | 0.5–3.0 | 1.4 | 1.0 |
| Calcium chlorate | 0.4–4.0 | 0.9 | 0.6 |
| Calcium hydroxide | 1.5–5.0 | 2.1 | 1.8 |
| Calcium carbonate | 1.0–5.0 | 1.3 | 1.1 |
| $Al_2O_3$, $Fe_2O_3$, etc. | 0.3–1.0 | 0.5 | 0.3 |
| Sodium chloride | 4.0–23.0 | 21.3 | 8.7 |
| Water | 0.4–2.5 | 0.8 | 0.5 |
| Total | 100.0 | 100.0 | 100.0 |

The particle size of calcium hypochlorite processed in accordance with the process of this invention is preferably that of most commercially available granular products having a screen analysis (U.S. Standard screens) of 70 to 85 percent passing through 10 mesh and being retained on 30 mesh, with not over about 3 percent passing through 100 mesh. However, a product comprises of granules which majority have a particle size range of from about −4 mesh to +325 mesh and preferably from about −10 mesh to about +200 mesh may be employed if desired.

The term "calcium hypochlorite" used in the specification and claims means "true" calcium hypochlorite, a compound of the formula, $Ca(OCl)_2$. Various calcium hypochlorite compositions contain varying amounts of $Ca(OCl)_2$ as indicated in Table I and elsewhere herein.

In the process of this invention, granular calcium hypochlorite containing at least about 65 percent of calcium hypochlorite is sprayed with an aqueous solution of an inorganic salt which is stable in contact with calcium hypochlorite. Preferably the inorganic salt is water-soluble, non-reactive with calcium hypochlorite and is an alkali metal or alkaline earth metal salt. Especially preferred salts are the alkali metal chlorides, alkali metal nitrates, alkaline earth metal chlorides, and alkaline earth metal nitrates such as those having sodium, potassium, lithium, magnesium, calcium, strontium or barium as the cation and chloride or nitrate as the anion. More specific examples of suitable salts are as follows:

| | |
|---|---|
| Sodium chloride | Sodium nitrate |
| Potassium chloride | Potassium nitrate |
| Lithium chloride | Lithium nitrate |
| Magnesium chloride | Magnesium nitrate |
| Calcium chloride | Calcium nitrate |
| Strontium chloride | Strontium nitrate |
| Barium chloride | Barium nitrate |

The aqueous mixture of the inorganc salt applied to the calcium hypochlorite granules is suitably an aqueous solution or slurry. Advantageously a concentrated solution is uses to form the desired coating using a minimum amount of water. To this end, a slurry is also advantageously used especially if the undissolved particles of the salt are finely divided. Micronized salt (−200 mesh), sold under the name "Microsized" salt is especially advantageous. Particles of the solid diluent in the slurry are preferably finer then 1000 microns for good coverage and adherence.

The concentration of salt in the aqueous solution may be varied within wide limits, for example from about 1.0 percent by weight to a pumpable highly concentrated slurry. Generally the concentration of dissolved salt in the solution ranges from about 5 percent up to the saturation concentration. If a slurry is employed the salt may be present in concentrations as high as about 75 percent by weight. Preferably the salt concentration ranges from about 10 to about 60 percent by weight of salt. For purposes of simplicity, the mixture of water and salt will be referred to hereinafter in the description and claims as an "aqueous mixture." This term covers either aqueous solutions of the salt or aqueous slurries of the salt, with the understanding that at higher concentrations of salt, a portion of the salt will be suspended in solid form in the aqueous solution.

Preferably the aqueous mixture is applied to the granules as a spray or mist, suitably with mixing in any convenient mixing device, for example, a twin shell blender, ribbon blender, etc. However, any suitable means of applying the aqueous mixture of inorganic salt to the granules may be used.

Sufficient aqueous mixture is applied to the granules of calcium hypochlorite to form on the surface of each granule a coating comprised of a mixture of inorganic salt and calcium hypochlorite dihydrate. The aqueous component of the aqueous mixture forms calcium hypochlorite dihydrate with the calcium hypochlorite on the surface of each granule and this hydrate combined with the inorganic salt forms an inert coating thereon. Sufficient aqueous mixture is admixed with the calcium hypochlorite to form a coating equivalent to from about 5 to about 60 and preferably from about 7 to about 25 percent by weight of each granule. Sufficient water is present in the aqueous mixture to form a proportion of calcium hypochlorite dihydrate in the coating equivalent to about 4 to about 50, and preferably from about 5 to about 25 percent by weight of the granule. Sufficient water soluble salt is present in the aqueous mixture to form in the coating a proportion of water soluble salt ranging from about 0.1 to about 15 percent and preferably from about 0.5 to about 7 percent by weight of the granule.

As indicated above, the water component of the aqueous mixture forms calcium hypochlorite dihydrate on the surface of each granule but the inorganic salt does not react with the calcium hypochlorite. The mixture of calcium hypochlorite dihydrate and inorganic salt acts as an inert coating on the surface of the calcium hypochlorite granules.

The addition of these inorganic salts is beneficial because they are inert and high melting and provide extra protection for the HTH in addition to the Ca(OCl)$_2$.2H$_2$O. The surface of the coated calcium hypochlorite particles has a hard glaze which the surface of untreated particles does not have.

The resulting granular calcium hypochlorite product is comprised of a core of calcium hypochlorite containing less than 5 percent by weight of water and at least 65 percent by weight of calcium hypochlorite. Each core is encapsulated by a coating comprised of a mixture of calcium hypochlorite dihydrate and a water soluble salt of the type described above. Preferably, the coated granules have a particles size ranging from about 0.15 to 3 millimeters in diameter and overall containing from about 60 to about 82 percent calcium hypochlorite. However, the particle size may range from about 0.05 to about 5 millimeters in diameter if desired.

Because of the inert coating on the surface of each granule the calcium hypochlorite product resists exothermic ignition and decomposition and also has improved resistance to caking and loss of available chlorine on storage.

The following examples are presented to define the invention more fully. All parts and percentages are by weight unless otherwise specified.

EXAMPLE 1

Five ml. of a nearly saturated salt solution, prepared by dissolving 25 g. of NaCl in 70 ml. of water, was sprayed onto 93 g. of commercial granular "HTH" brand calcium hypochlorite containing 73.5 percent available chlorine or about 74 percent Ca(OCl)$_2$. The "HTH" granules were spread out in a thin layer and stirred while spraying to coat the granules uniformly. The final mixture was loose and free-flowing and contained 66.86 percent available chlorine or about 67.2 percent Ca(OCl)$_2$ and 5.29 percent water. The coating on each granule was about 17.3 percent, the calcium hypochlorite dihydrate portion of the coating was about 13.6 percent, and the sodium chloride was about 3.8 percent. The surface of the particles had a hard glaze which the untreated particles did not have.

Portions of this product were tested by contact with lighted matches and burning cigarettes but no self-sustaining reaction occurred.

EXAMPLE 2

A solution of 10 g. of anhydrous CaCl$_2$ in 10 ml. of water was prepared. Approximately 8 ml. of this solution was sprayed on 100 g. of commericial "HTH" spread out in a thin layer. The mixture was stirred while spraying to give a uniform coating of the granules and to break up any agglomerates. The final product was free-flowing. The coating on each granule was about 18.7 percent, the calcium hypochlorite dihydrate portion of the coating was about 14.7 percent and the calcium chloride was about 3.7 percent.

Portions of this product were tested with lighted cigarettes and burning matches but no self-sustaining reactions occurred.

EXAMPLE 3

A solution of 10 g. of NaNO$_3$ in 10 ml. of water was prepared. Five ml. of this solution was sprayed onto 95 g. of commercial "HTH" containng 73.5 percent of available chlorine or about 74 percent of Ca(OCl)$_2$ spread out in a thin layer. The granules were stirred while spraying to obtain uniform distribution. The coating on each granule was about 11.7 percent, the calcium hypochlorite dihydrate portion of the coating was about 9.2 percent and the sodium nitrate was about 2.5 percent.

Portions of this product were tested with lighted cigarettes and burning matches and no self-sustaining reactions took place.

EXAMPLE 4

A saturated solution of NaCl in H$_2$O was prepared. Five ml. of this solution was sprayed onto 95 g. of commercial "HTH" containing 73.5 percent of available chlorine or about 74 percent of Ca(OCl)$_2$ and 1.0 percent of water. While spraying, the granules were stirred. The coating on each granule was about 14.9 percent, the calcium hypochlorite dihydrate portion of the coating was about 13.6 percent and the sodium chloride was about 1.3 percent. The glazed surface coating was scraped from some of the resulting granules and was identified as a mixture of Ca(OCl)$_2$.2H$_2$O and NaCl by X-ray analysis.

EXAMPLE 5

A slurry of 57 parts by weight of "Microsized" salt (NaCl) and 43 parts of water was sprayed on commercial granular "HTH" with stirring as in the preceding examples. The final product contained 67.5 percent available chlorine or 67.9 percent of Ca(OCl)$_2$ and 4.9 percent of water.

For comparison, a sample of commercial granular calcium hypochlorite was sprayed with water as described in U.S. Pat. No. 3,544,267 to produce a hydrated product containing 9.8 percent water.

Neither of these products undergoes any self-sustaining decomposition reaction in contact with lighted cigarettes or burning matches.

Both of these products were maintained at 100°C. and ambient humidity for 2 hours. At the end of this time, the first product, sprayed with the salt slurry, contained 65.76 percent of available chlorine and the second product, sprayed with water, contained 60.14 percent of available chlorine. The latter product was badly caked but the first product was not. Loss of available chlorine for the first product was 2.58 percent and for the second product was 14.92 percent.

EXAMPLE 6

A slurry of 3.5 parts by weight of "Microsized" salt (NaCl) and 2.6 parts of water was sprayed on 93.9 parts commercial granular "HTH" with stirring as in the preceding examples. The original "HTH" contained 73.5 percent available chlorine and 1.0 percent water. Final water content was 3.5 percent. Final available chlorine was 67.50 percent. The coating on each granule was about 12.7 percent, the calcium hypochlorite dihydrate portion of the coating was about 9.2 percent and the sodium chloride was about 3.5 percent. The product was loose and free-flowing and showed no evidence of dampness or sticking. It did not undergo self-sustained decomposition when tested with lighted cigarettes or burning matches.

What is claimed is:

1. A granular calcium hypochlorite composition in which each granule is comprised of a core of calcium hypochlorite containing at least about 65 percent by weight of calcium hypochlorite and less than about 5 percent by weight of water, said core being encapsulated by a coating comprised of a mixture of calcium hypochlorite dihydrate and a water soluble salt selected from the group consisting of alkali metal chlorides, alkali metal nitrates, alkaline earth metal chlorides, alkaline earth metal nitrates, and mixtures thereof, said water soluble salt being nonreactive with and stable to said calcium hypochlorite, said coating comprising from about 5 to about 60 percent by weight of said granule, the proportion of said water soluble salt in said coating ranging from about 0.1 to about 15 percent by weight of said granule, and the proportion of said calcium hypochlorite dihydrate in said coating ranging from about 4 to about 50 percent by weight of said granule.

2. The granular calcium hypochlorite composition of claim 1 wherein said coating is comprised of from about 7 to about 25 percent by weight of said granule, the proportion of said water soluble salt in said coating ranging from about 0.5 to about 7 percent by weight of said granule, and the proportion of said calcium hypochlorite dihydrate in said coating ranging from about 5 to about 25 percent by weight of said granule.

3. The granular calcium hypochlorite composition of claim 2 wherein the particle size of the majority of said granules ranges from about 0.05 to about 5 millimeters in diameter.

4. The granular calcium hypochlorite composition of claim 3 wherein the majority of said granules have a particle size ranging from about 0.15 to about 3 millimeters in diameter.

5. The composition of claim 4 wherein said water soluble salt is calcium chloride.

6. The composition of claim 4 wherein said water soluble salt is sodium chloride.

7. The composition of claim 4 wherein said water soluble salt is sodium nitrate.

8. The method of producing the composition of claim 1 which comprises admixing calcium hypochlorite granules containing less than about 5 percent water and at least about 65 percent by weight of calcium hypochlorite with an aqueous mixture of water and a water soluble inorganic salt selected from the group consisting of alkali metal chlorides, alkali metal nitrates, alkaline earth metal chlorides, alkaline earth metal nitrates, and mixtures thereof, wherein said water soluble salt is nonreactive with and stable to said calcium hypochlorite, said water from said aqueous mixture forming calcium hypochlorite dihydrate on the surface of each of said calcium hypochlorite granules, sufficient aqueous mixture being added to said solid calcium hypochlorite granules to form a coating thereon comprised of a mixture of said calcium hypochlorite dihydrate and said water soluble salt, said coating comprising from about 5 to about 60 percent by weight of said granule, the proportion of said water soluble salt comprising from about 0.1 to about 15 percent by weight of said granule.

9. The method of claim 8 wherein the majority of said calcium hypochlorite granules have a particle have a particle size ranging from −4 mesh to + 325 mesh.

10. The method of claim 8 wherein said aqueous mixture is admixed with said calcium hypochlorite granules to form a coating comprising from about 7 to about 25 percent by weight of said granules, the proportion of said water soluble salt comprising about 0.5 to about 7 percent by weight of said granules and the proportion of said calcium hypochlorite dihydrate in the coating comprising from about 5 to about 25 percent of said granules.

11. The method of claim 10 wherein said aqueous mixture is a slurry of solid particles of water soluble salt suspended in a saturated aqueous solution of said water soluble salt.

12. The method of claim 11 wherein said water soluble salt is sodium chloride.

13. The method of claim 11 wherein said water soluble salt is calcium chloride.

14. The method of claim 11 wherein said water soluble salt is sodium nitrate.

15. The method of claim 11 in which the solid particles of said water soluble salt are finer than about 1000 microns.

16. The method of claim 15 wherein said water soluble salt is sodium chloride.

17. The method of claim 11 in which said aqueous mixture is applied by spraying.

* * * * *